(12) United States Patent
Mo et al.

(10) Patent No.: US 10,698,584 B2
(45) Date of Patent: Jun. 30, 2020

(54) USE OF REAL-TIME METADATA TO CAPTURE AND DISPLAY DISCOVERY CONTENT

(75) Inventors: Stanley Mo, Portland, OR (US); Claudio J. Ochoa, Villa Allende (AR); Gustavo D. Domingo Yaguez, Villa Allende (AR); Robert Staudinger, Freilassing (DE)

(73) Assignee: Intel Corporation, Santa Clara, CA (US)

( * ) Notice: Subject to any disclaimer, the term of this patent is extended or adjusted under 35 U.S.C. 154(b) by 912 days.

(21) Appl. No.: 13/977,833

(22) PCT Filed: Dec. 13, 2011

(86) PCT No.: PCT/US2011/064573
§ 371 (c)(1),
(2), (4) Date: Mar. 11, 2014

(87) PCT Pub. No.: WO2013/089674
PCT Pub. Date: Jun. 20, 2013

(65) Prior Publication Data
US 2014/0201645 A1   Jul. 17, 2014

Related U.S. Application Data

(60) Provisional application No. 61/533,448, filed on Sep. 12, 2011.

(51) Int. Cl.
*G06F 3/0484* (2013.01)
*G06Q 30/06* (2012.01)
(Continued)

(52) U.S. Cl.
CPC .......... *G06F 3/04842* (2013.01); *G06F 16/44* (2019.01); *G06F 16/903* (2019.01); *G06F 16/9535* (2019.01); *G06Q 30/06* (2013.01)

(58) Field of Classification Search
None
See application file for complete search history.

(56) References Cited

U.S. PATENT DOCUMENTS 5,909,551 A * 6/1999 Tahara ............... G09B 5/065
                                                    360/27
6,209,130 B1 * 3/2001 Rector, Jr. .......... H04H 60/06
                                                    725/50
(Continued)

FOREIGN PATENT DOCUMENTS

JP  2009-169924 A  7/2009
JP  2010-170191 A  8/2010
(Continued)

OTHER PUBLICATIONS

Office Action for Chinese Patent Application No. 201180073876.3, dated Mar. 30, 2016, 27 pages with 16 pages of English translation.
(Continued)

*Primary Examiner* — Tuan S Nguyen
(74) *Attorney, Agent, or Firm* — Jordan IP Law, LLC

(57) ABSTRACT

Methods and systems may involve receiving metadata associated with an activity of a user with respect to a first device, and capturing discovery content from one or more media sources based on the metadata. In addition, the discovery content and the metadata may be presented to the user via a second device.

25 Claims, 5 Drawing Sheets

(51) Int. Cl.
*G06F 16/9535* (2019.01)
*G06F 16/903* (2019.01)
*G06F 16/44* (2019.01)

(56) References Cited

U.S. PATENT DOCUMENTS

| | | | | |
|---|---|---|---|---|
| 6,366,923 | B1* | 4/2002 | Lenk | G06F 17/30899 |
| | | | | 707/706 |
| 7,437,301 | B2 | 10/2008 | Kageyama et al. | |
| 8,793,730 | B2* | 7/2014 | Mowrey | H04N 5/44543 |
| | | | | 725/133 |
| 2002/0019827 | A1* | 2/2002 | Shiman | G06F 21/6218 |
| 2007/0050175 | A1* | 3/2007 | Schmelzer | G06F 17/3089 |
| | | | | 702/186 |
| 2008/0092044 | A1 | 4/2008 | Lewis et al. | |
| 2009/0006341 | A1* | 1/2009 | Chapman | G06F 17/30864 |
| 2009/0063419 | A1* | 3/2009 | Nurminen | G06F 17/30206 |
| 2009/0182727 | A1* | 7/2009 | Majko | G06F 17/30554 |
| 2009/0222755 | A1 | 9/2009 | Drieschner | |
| 2010/0169917 | A1* | 7/2010 | Harboe | H04N 7/15 |
| | | | | 725/34 |
| 2010/0287588 | A1* | 11/2010 | Cox | H04N 5/44543 |
| | | | | 725/40 |
| 2011/0043652 | A1* | 2/2011 | King | G06F 17/2211 |
| | | | | 348/222.1 |
| 2011/0047517 | A1 | 2/2011 | Lee et al. | |
| 2011/0119046 | A1* | 5/2011 | Shinozaki | G06F 17/2735 |
| | | | | 704/2 |
| 2011/0231432 | A1* | 9/2011 | Sata | G06F 17/2735 |
| | | | | 707/769 |
| 2011/0238495 | A1* | 9/2011 | Kang | G06Q 30/02 |
| | | | | 705/14.49 |
| 2011/0311059 | A1* | 12/2011 | Le Mer | G06F 17/30775 |
| | | | | 381/17 |
| 2012/0174155 | A1* | 7/2012 | Mowrey | H04N 5/44543 |
| | | | | 725/40 |
| 2012/0221592 | A1* | 8/2012 | Nakayama | G06F 16/90324 |
| | | | | 707/769 |

FOREIGN PATENT DOCUMENTS

| | | |
|---|---|---|
| JP | 2011-215909 A | 10/2011 |
| KR | 10-2011-0129715 A | 12/2011 |
| WO | 2008/110790 A2 | 9/2008 |
| WO | 2013/089674 A1 | 6/2013 |
| WO | 2015150522 A1 | 10/2015 |

OTHER PUBLICATIONS

Office Action and Search Report for Taiwanese Patent Application No. 101131004, dated Jul. 16, 2015, 22 pages. Includes 12 pages of English translation.
European Search Report for EP Patent Application No. 11877283.9, dated Jul. 1, 2015, 7 pages.
Office Action for Japanese Patent Application No. 2014-542294, dated May 12, 2015, 4 pages. Includes 3 pages of English translation.
Office Action for Japanese Patent Application No. 2014-542294, dated Jul. 28, 2015, 6 pages. Includes 3 pages of English translation.
International Preliminary Report on Patentability and Written Opinion received for PCT Patent Application No. PCT/US2011/064573, dated Jun. 26, 2014, 8 pages.
International Search Report and Written Opinion received for PCT application No. PCT/US2011/064573, dated Aug. 14, 2012, 15 pages.
Office Action for Chinese Patent Application No. 201180073876.3 dated Dec. 2, 2016, 23 pages including 13 pages of English translation.
Office Action for Chinese Patent Application No. 201180073876.3 dated Jun. 2, 2017, 7 pages including 4 pages of English translation.

* cited by examiner

FIG. 1
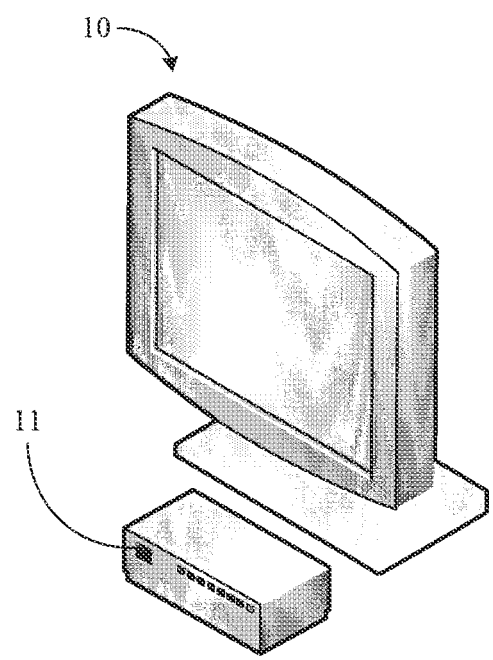
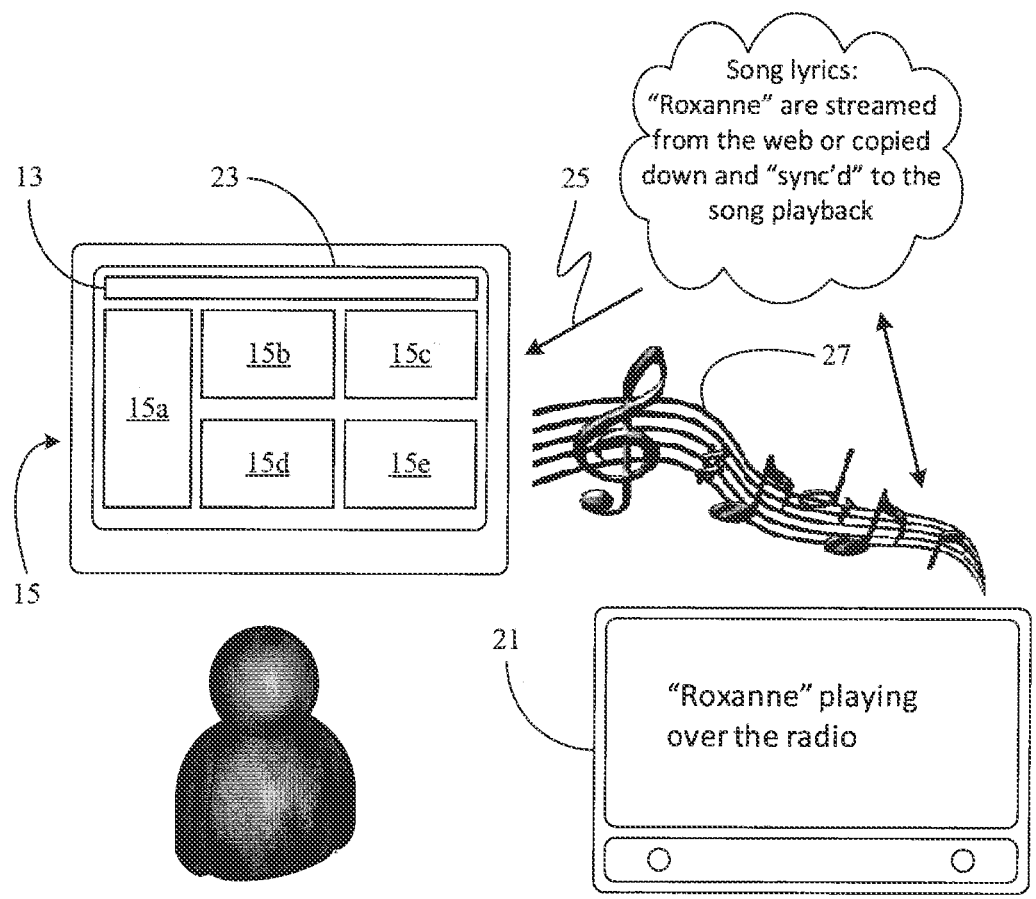
FIG. 2

USE OF REAL-TIME METADATA TO CAPTURE AND DISPLAY DISCOVERY CONTENT

CROSS-REFERENCE TO RELATED APPLICATIONS

The present application claims the benefit of priority to U.S. Provisional Patent Application No. 61/533,448 filed Sep. 12, 2011.

BACKGROUND

Technical Field

Embodiments generally relate to media content. More particularly, embodiments relate to the use of real-time metadata to capture and present discovery content across multiple devices.

Discussion

Individuals may use and interact with various devices such as televisions, smartphones, smart tablets, computers, and so forth, throughout a given day. Typically, the process of obtaining information and/or programming may be confined to a single device. For instance, if a user is interested in obtaining the biography of an actor in a movie being viewed on a television (TV), the user may need to know at least the name of the movie to then check the cast on an Internet movie database. If the TV lacks a network connection, the user may need to remember or write down the name of the movie in order to conduct the search on another device such as a computer. In the case of secondary actors, the actor of interest may not be mentioned on the cast of the movie, making it even more difficult for the user to find information on the actor. Particularly, within a television environment, the activities listed above may be quite disruptive to the actual experience of watching television. This may also hold true for someone relaxing to music, reading a book or sifting through photos. The ability to quickly capture an important tangible during an experience and hold or act on this item without disrupting the primary experience may be a significant challenge today. Accordingly, there remains significant room for improvement with regard to user access to media and related information.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a perspective view of an example of a generating media device according to an embodiment;

FIG. 2 is a block diagram of an example of an audio stream having a separate distribution path for lyrics according to an embodiment;

DETAILED DESCRIPTION

Figure 3:
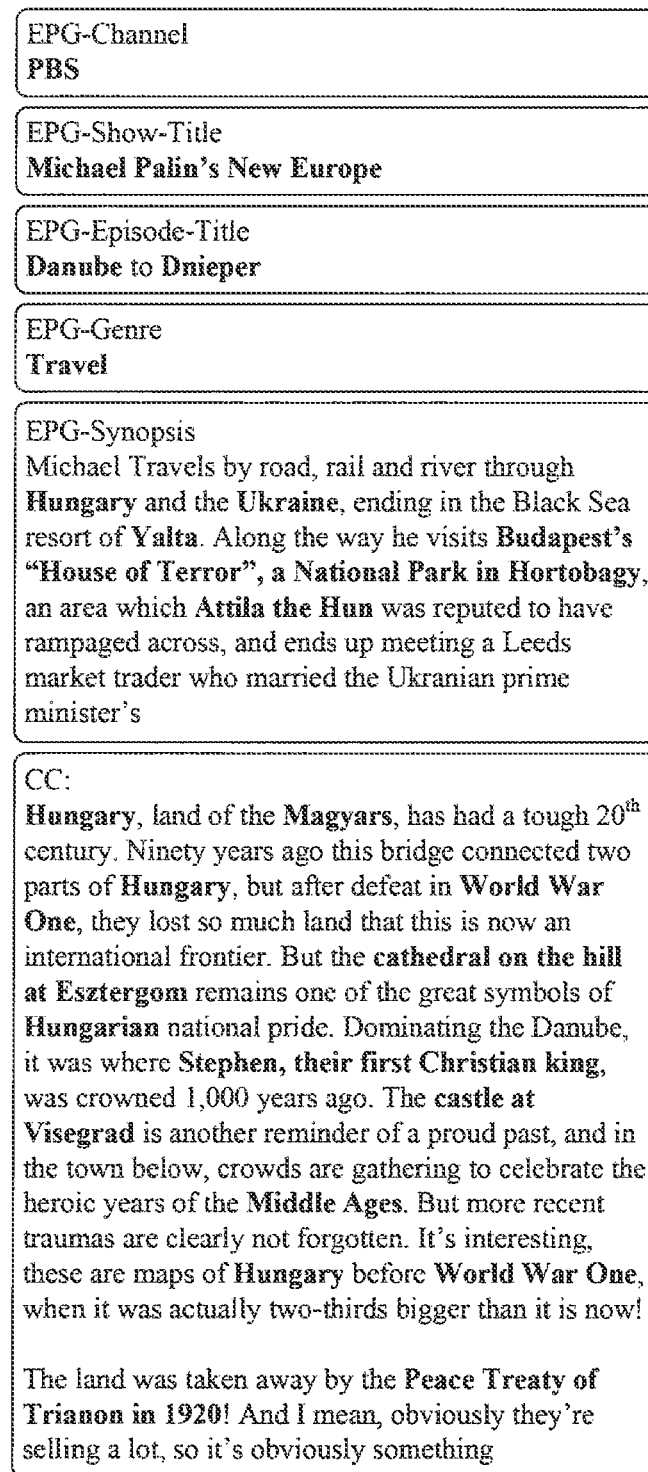
FIG. 3 is a listing of an example of content associated with a source activity according to an embodiment.

Embodiments may include at least one computer accessible storage medium having a set of instructions which, if executed by a processor, cause a computer to receive real-time metadata associated with an activity of a user with respect to a first device. The instructions may also cause a computer to capture discovery content from one or more media sources based on the real-time metadata, and present the discovery content and the real-time metadata to the user via a second device.

Embodiments may also include a companion device having a user interface, a network interface, a processor and at least one computer accessible storage medium with a set of instructions which, if executed by the processor, cause the companion device to receive real-time metadata via the network interface. The real-time metadata may be associated with an activity of a user with respect to a media device. The instructions may also cause the companion device to capture discovery content from one or more media sources based on the real-time metadata, and present the discovery content and the real-time metadata to the user via the user interface.

In addition, embodiments may include an apparatus having a metadata module configured to receive real-time metadata associated with an activity of a user with respect to a first device, and a discovery module configured to capture discovery content from one or more media sources based on the real-time metadata. The apparatus may also include a presentation module configured to present the discovery content and the real-time metadata to the user via a second device.

Other embodiments may include a computer readable storage medium having a set of instructions which, if executed by a processor, cause a computer to configure one or more widgets based on user input, and receive real-time metadata associated with an activity of a user with respect to a first device. The real-time metadata may be received from the first device in accordance with a chat protocol. The instructions may also cause a computer to present the real-time metadata to the user via a second device, identify the user, and detect a selection by the user from the real-time metadata. In addition, the instructions may cause a computer to use the one or more widgets to capture discovery content from one or more media sources based on the selection, wherein the one or more media sources are to include at least one web service. The instructions may also cause a computer to aggregate the discovery content, filter the discovery content, and present the discovery content to the user via the second device.

Additionally, a computer implemented method may involve configuring one or more widgets based on user input, and receiving real-time metadata associated with an activity of a user with respect to a first device, wherein the real-time data is received from the first device in accordance with a chat protocol. The method may also include presenting the real-time metadata to the user via a second device, detecting a user selection from the real-time metadata, and using the one or more widgets to capture discovery content from one or more media sources based on the user selection, wherein the one or more media sources include at least one web service. The discovery content may be presented to the user via the second device.

It has been determined that a common practice of TV viewers may be to use the Internet while watching TV. Indeed, Table I below shows a report from the Nielson Company indicating that the most popular device to browse the Internet while watching TV may be the smart tablet. For example, individuals may use a smart tablet as a companion device to either look for extra information related to the TV show they are watching, or for sharing their TV experience with other individuals in their social circles.

TABLE I

"Persons 2+ Watching TV and Using the Internet Simultaneously
At Least Once Per Month - June 2009"

| Activity | Persons (P2+) |
| --- | --- |
| % of Persons Using TV/Internet Simultaneously | 56.9% |
| Estimated Number of Persons Using TV/Internet Simultaneously | 128,047,000 |
| Time Spent Simultaneously Using TV/Internet Per Person in Hours:Minutes | 2:39 |
| Average % of TV time Panelists spent also using the Internet | 2.7% |
| Average % of Internet time Panelists spent also using the TV | 27.9% |

In general, a solution is disclosed in which one or more metadata "generators" and one or more metadata "consumers" may use a unique protocol to discover each other and exchange metadata. Metadata generators and consumers may reside in multiple devices (in fact, any device could be both a metadata extractor and a consumer at the same time). In one example, metadata consumers are connected to the Internet.

Metadata Generation

Turning now to FIG. 1, a device 10 is shown in which the device 10 includes a real-time keyword extractor, a keyword terms database, smart TV functionality, an EPG (electronic in program guide) extractor, and a chat network connection 11. In general, metadata generation may be achieved by extracting information from any content being consumed by end users. This content may include, but is not limited to, broadcast live and recorded TV shows and movies, any kind of streamed videos, closed-caption/subtitling information through broadcast or the Internet or web service, including HTML5 (Hypertext Mark-up Language 5), public videos, as well as content from paid streaming services, radio broadcasts and podcasts, e-books, website content, etc. Thus, the device 10 may also include other types of devices such as, for example, e-book readers, servers, personal computers (PCs), laptop computers, smart tablets, smartphones, personal digital assistants (PDAs), mobile Internet devices (MIDs), media players, in-vehicle-infotainment (IVI) systems, etc. The keyword terms database may also have a preference learning capability.

Depending on the source of content, there may be several methods to extract metadata. For example, it may be straightforward to obtain keywords from text-based sources, such as websites. In the case of TVs, static (i.e., non-real-time) keywords may be extracted from the EPG, which may offer information such as the name of the show, cast, synopsis, etc. There may be other ways to obtain dynamic (i.e., real-time) keywords from the TV, by extracting them from video-embedded text such as closed caption (CC) or subtitle information, if available.

For example, FIG. 2 demonstrates that the content being consumed by end users may be partitioned so that the content being monitored for keywords may be delivered via a different path (and/or from a different source) than the path through which the audible or visual component of the content is delivered. In particular, a song (e.g., "Roxanne") may be delivered to a device such as a radio 21 via a broadcast digital or analog transmission (e.g., frequency modulated/FM, amplitude modulated/AM, satellite), wherein the lyrics to the song may be streamed to a device such as a tablet 23 via an Internet or web connection. In such a case, the keyword extraction may be conducted with regard to a data stream 25, whereas the user may be actually listening to an audible signal 27 from the radio 21. Accordingly, from the user's perspective, the audible signal 27 may appear to be synchronized with the data stream 25, while an application on the tablet 23 is extracting keywords from the data stream 25.

In one example, a tag cloud 13 may be configured to display the lyrics of the song (or extracted keywords from the lyrics) concurrently with discovery content 15 (15a-15e), wherein the discovery content 15 may be dynamically updated in response to user selections from the streamed lyrics. Indeed, the lyrics may alternatively be previously downloaded to the tablet 23a, wherein the extracted keywords may be used to stretch the lyrics to approximate the song length in order to "re-synchronize" the downloaded lyrics with the song being played. Other alternatives may include employing speech recognition techniques to detect keywords from the audible dialog in the video/audio. A similar method may be applied to podcasts and radio broadcasts, when no other real-time metadata is available. More advanced techniques for keyword extraction may be possible, including, but not limited to, image processing and face recognition of a video stream.

FIG. 3 shows a listing 12 of textual content associated with a program entitled "Michael Palin's New Europe", wherein the listing 12 may be used to extract metadata. For example, one approach may be to flag proper nouns (e.g Hungary), chaining consecutive proper nouns (e.g. World War I), or proper nouns separated by prepositions (e.g., Peace Treaty of Trianon) as relevant keywords. More sophisticated algorithms include, but are not limited to, consulting a database of places and famous names, looking for repeating phrases, ranking higher those words that appear in the Show Title, Episode Title and Synopsis in the EPG, and learning from user behavior.

The learning may be conducted in real-time as the user selects items to read or interact with, wherein those decisions may generate coefficients or modifiers that impact the search and selection processes. The coefficient/modifier information may also be obtained from other or previous sources, as well as from contextual information about the user. For example, calendars, previous destinations (e.g., navigation information), and user selections not related to the current activity (e.g., specific TV-companion device interaction currently underway), and other historical user preference data may all be used to learn the user's behavior. The learning process may also be impacted by who else is on the user network. For instance, the presence of a friend or business colleague versus a child or spouse may impact the person's decisions and what should be brought to their attention. Other influences include, but are not limited to, social networking (e.g., Facebook), and other interactions. Simply put, the contextual content associated with the learning process may also serve as a source for content keywords.

Metadata Consumption

Figure 4:
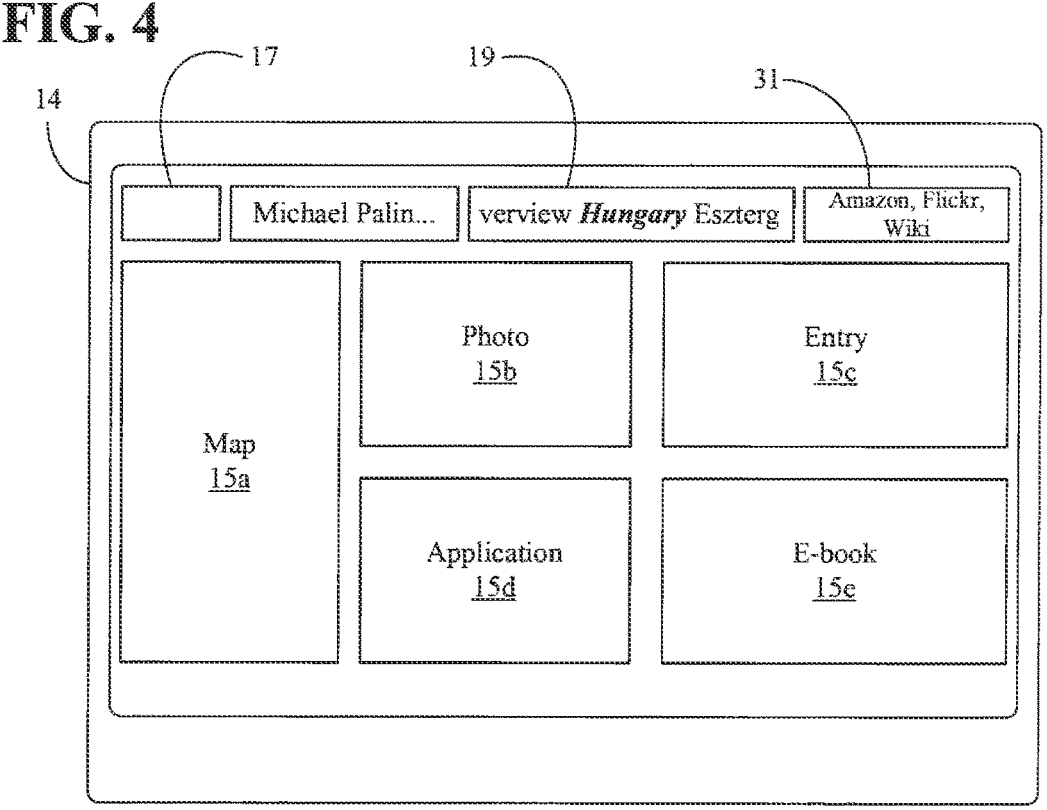
FIG. 4 is a screenshot of an example of a consuming companion device display according to an embodiment.

FIG. 4 demonstrates that metadata produced by one metadata generator can be consumed by multiple devices, which may be connected to the Internet. For example, a companion (e.g., secondary) device 14 such as a tablet may consume metadata from another generator such as the device 12 (FIG. 1), already discussed. In the illustrated example, the device 14 displays the current channel 17 being viewed on the generating (e.g., primary) media device, the keywords 19 extracted from the generating media device, one or more web services (e.g., Amazon, Flickr, Wikipedia) 31 that may be used to discover additional content based on the metadata, as well as one or more discovery panels 15 containing the content obtained from the web services 31.

Thus, the consumption of metadata may be the heart of the discovery process. In this process, a keyword selected by the user may be used to pull information (or subscribe to push information) from multiple web sources or local storage systems and applications, which may be previously configured and/or selected by the user. In this regard, most web sources may offer application programming interfaces (APIs) for performing searches and lookups in their databases. For example, the web services may include, but are not limited to, Movie, TV and music specialized sites such as, for example, iMDB, AllRovi, AllMusic, Rotten Tomatoes, Metacritic, Flickchart, etc.

Media sites such as, for example, Youtube, Flickr, Picasaweb, Panoramio

General information sites such as, for example, Wikipedia eCommerce and auction sites such as, for example, Amazon.com, eBay, AppUp, Craigslist Social sites such as, for example, Twitter, Facebook, StumbleUpon News sites such as, for example, Google News, Yahoo!News, online paper websites Betting sites such as, for example, Bwin A publish-subscribe mechanism may be used to implement metadata consumption. For example, any application able to consume metadata may subscribe to one or more metadata generators. When the two devices are online and connected (using a chat protocol, discussed in greater detail below), the generator may send metadata to all devices subscribed.

Once an application receives the metadata, it may display the new keyword and wait for user interaction. For example, FIG. 4 demonstrates that the user has selected the keyword "Hungary" from a scrolling list of keywords (e.g., tag cloud) 19 near the top of the screen. When the user selects a keyword, the application may query information from the user preferred web sources, and populate the main screen. Thus, a portion of the screen may be populated with discovery content including map content 15a of Hungary, Flickr photo content 15b (e.g., of the Danube river). AppUp application content 15d available for purchase/download (e.g., entitled "SpeakEasy: Ukranian"), Wikipedia entry content 15c (e.g., on the Dnieper River), and Amazon.com e-book content 15e (e.g., entitled "Lonely Planet—Hungary").

Rather than building a monolithic application, a better approach may be to build a pluggable application, composed by widgets, such that Independent Software Developers (ISVs) can generate new widgets to be added to the main screen of the consuming companion device. The ISVs may use APIs that notify the widget when a new keyword is available, and use those keywords to get information and display it via the widget. In some cases, a widget may use the APIs and plug-in structure to pass metadata or other messages to an adjacent web-service or application to create a composite response, which may be the sum of different web-services acting together in a collaborative manner. The response may also simply be a reference where one plug-in sends the metadata to what it believes is a more relevant and appropriate web service plug-in to handle the transaction. Users may then browse among multiple sources (or mashed up sources) of information, and select those whose content is preferred. The techniques described herein may also be integrated with e-commerce mechanisms. For instance, the user may be interested in a couch being displayed in a current soap show, and a widget could offer the best sites to go and buy that exact couch.

Protocol

The protocol used to discover devices and exchange metadata may be standard and open. For example, a chat protocol may be developed around a well defined standard such as, for example, XMPP (Extensible Messaging and Presence Protocol, Internet Engineering Task Force). In particular, all participant applications (metadata extractors and consumers) may be registered into an XMPP server, enabling bidirectional messaging among each of them. The use of an underlying technology such as XMPP may enable the burden of the device discovery and presence process to be addressed by the server. When a new application is started, the application may contact the XMPP server, which may notify all applications that are "friends" of this application of the application's presence on the chat network. XMPP may also support the publish-subscribe mechanism thru extensions.

Figure 5:
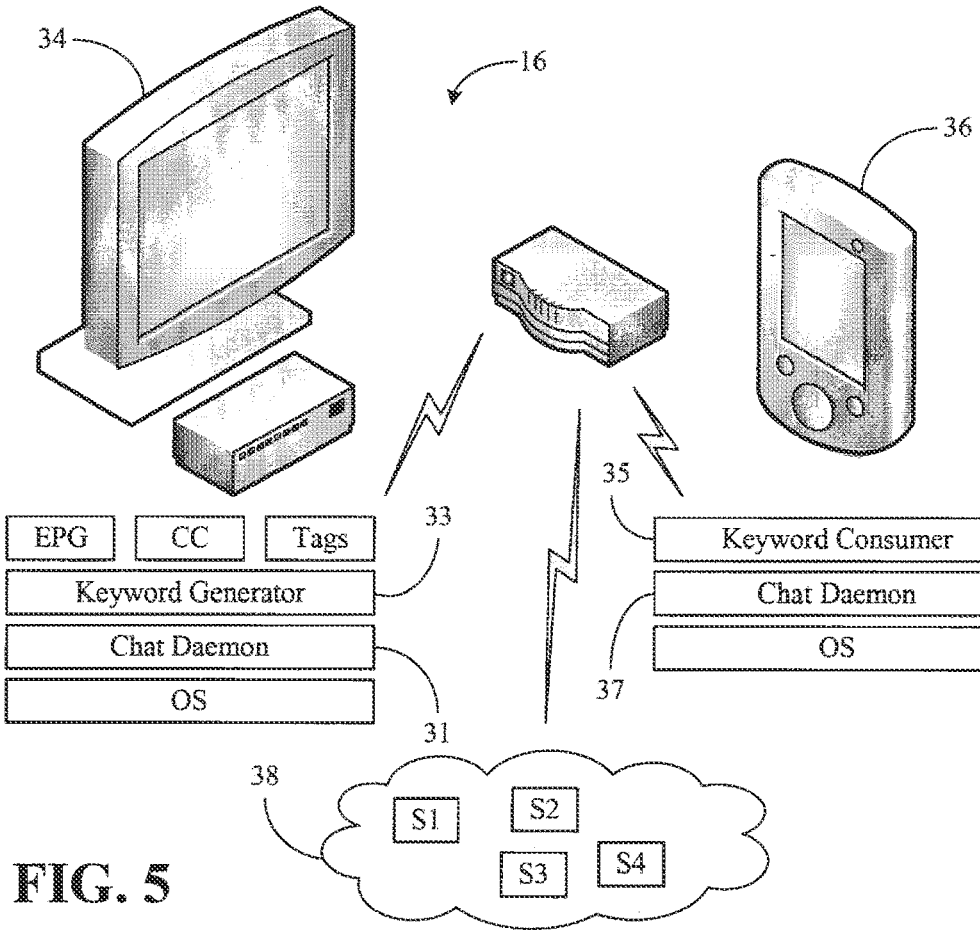
FIG. 5 is a block diagram of an example of a metadata sharing architecture according to an embodiment.

FIG. 5 shows an architecture 16 that demonstrates a common scenario in which metadata extraction occurs in a TV 34, and metadata consumption occurs in a companion device 36 such as a smart phone or a smart tablet device. On the illustrated TV 34, there is a chat daemon 31 running that shares keywords extracted from information about the show being watched. In the case of broadcasted signals, the information may be extracted from the EPG (static information) and/or from the closed caption text (dynamic information). In the case of IPTV (Internet Protocol TV), HTML5 videos may be annotated, providing dynamic information as well. A keyword generator 33 may extract keywords, and use the chat daemon 31 to send those keywords to the companion device 36 or other devices through a data channel that is open thru chat-based protocols.

On the companion device 36, such as a tablet, there may be a user-facing keyword consumer application 35 that uses a chat daemon 37 to obtain, in real-time, the keywords sent by the TV 34 through chat channels, and populates a list or "tag cloud" of keywords accordingly. In response to a user clicking on any of the keywords in the list or tag cloud, the application 35 may query multiple web services 38 ("S1" through "S4", e.g., major encyclopedias like Wikipedia, major news sites like Google News, major social networks like Twitter, major stores like Amazon, etc.), according to one or more user preferences. The main screen of the companion device 36 may be populated with information retrieved from those services in multiple areas associated with widgets. Each widget may have its own actions following user interaction. The user may close widgets and open new ones by simply selecting a new provider of their preference. In addition, the aggregated data, in the case of a closed caption text stream, may create small "piles" of captured information that are organized in a continuous stream from the TV show. The user may click on these piles to navigate backward and forward through the TV program (assuming it is locally captured or in an accessible streaming server), using each pile as a topical insert point to the video stream where the keyword was introduced. This approach may enable the user to easily navigate video based on sub-topics and where/when they were introduced in the TV programming.

Figure 6:
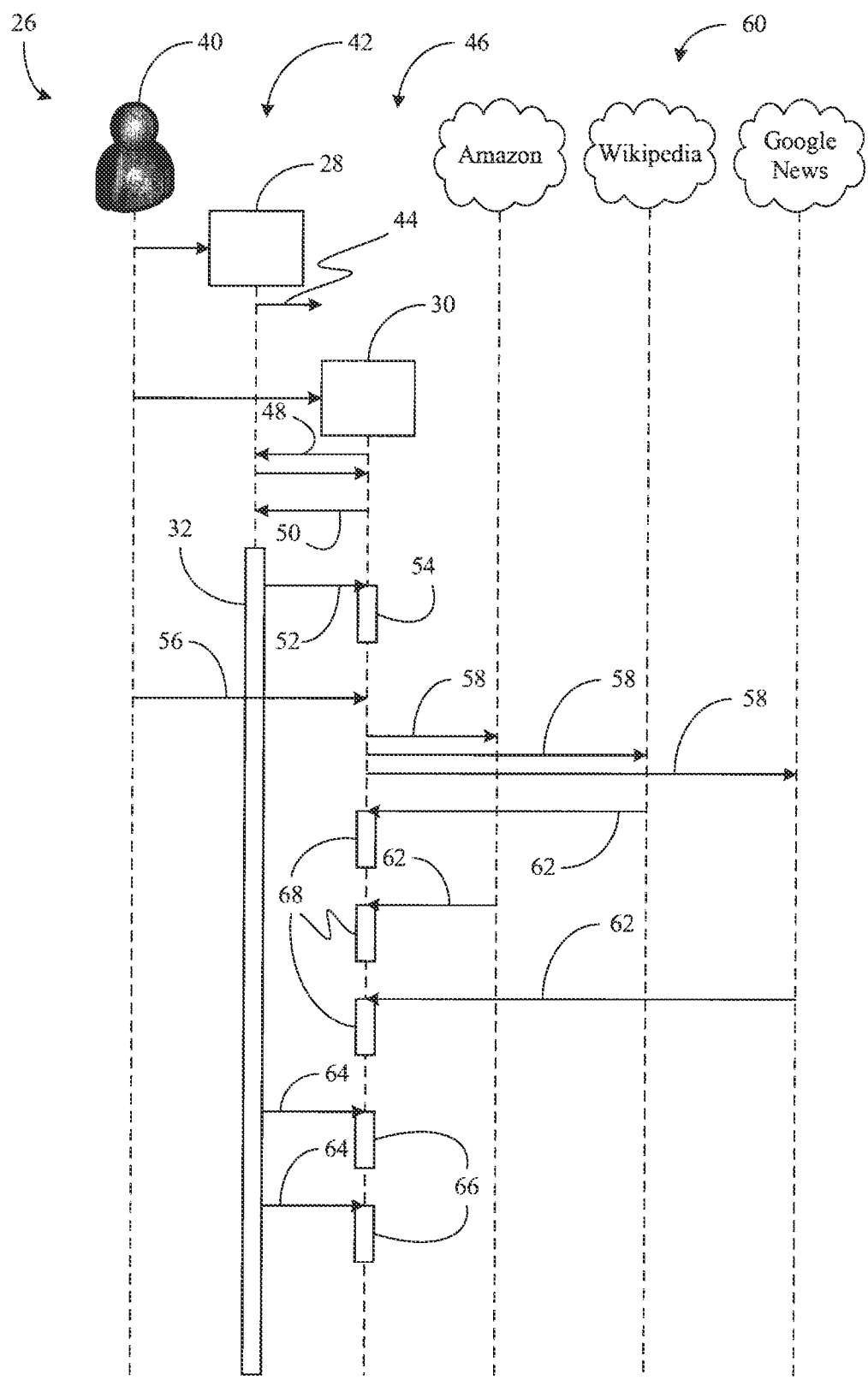
FIG. 6 is a messaging sequence diagram of an example of a metadata sharing scenario to according to an embodiment.

FIG. 6 shows a messaging sequence 26 in which a user 40 turns on a TV 42, which invokes a metadata generator 28 and causes one or more multicast domain name system (mDNS) messages 44 to be generated. In addition, the user 40 may launch an application on a tablet 46, which invokes a metadata consumer 30 and causes one or more mDNS messages 48 to be generated by the tablet 46. The illustrated mDNS messages 48 from the tablet 46 are acknowledged by the TV 42, in the example shown. Accordingly, the metadata consumer 30 may subscribe to the keywords being extracted by the metadata generator 28 via a subscription message 50. As a keyword extraction algorithm 32 resident on the TV 42 transmits keywords 52 to the tablet 46, they may be used to populate a tag cloud 54 on the display of the tablet 46. As the illustrated user 40 selects keywords from the tag cloud 54, queries 58 may be issued to one or more widget providers 60 for extra information. The display of the tablet 46 may be populated 68 with the extra information (e.g., discovery content) 62 from the widget providers 60, wherein the keyword sharing 64 and tag cloud population 66 processes may be conducted similarly (e.g., repeated) as it regard to the keywords 52 and the tag cloud 54, as the user 40 continues to make selections from the tag cloud while watching TV.

Figure 7:
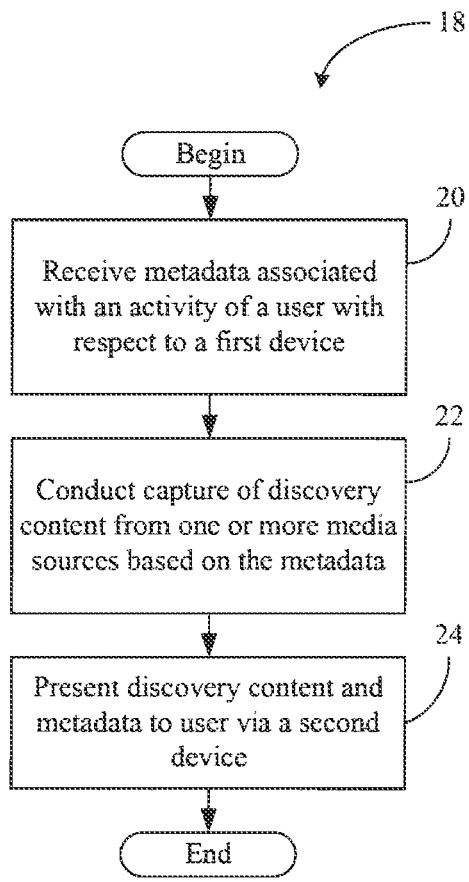
FIG. 7 is a flowchart of an example of a method of sharing metadata according to an embodiment.

Turning now to FIG. 7, a method 18 of sharing metadata is shown. The illustrated method 18, may be implemented, for example, as a set of executable logic instructions stored in at least one machine- or computer-readable storage medium such as random access memory (RAM), read only memory (ROM), programmable ROM (PROM), flash memory, firmware, microcode, etc., in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 18 may be written in any combination of one or more programming languages, including, for example, an object oriented programming language such as C++ or the like and conventional procedural programming languages, such as the "C" programming language or similar programming languages. Moreover, various aspects of the illustrated functionality may be implemented as embedded logic of a processor using any of the aforementioned circuit technologies.

Processing block 20 provides for receiving metadata on a second device, the metadata being associated with an activity of a user with respect to a first device. Discovery content may be captured from one or more media sources at block 22, and illustrated block 24 presents the discovery content and the metadata to the user via the second device.

Figure 8:
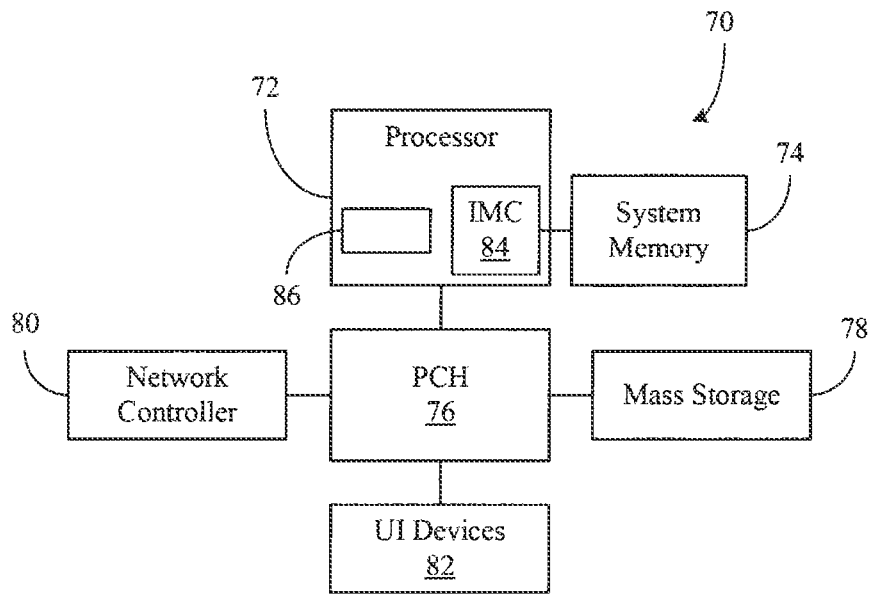
FIG. 8 is a block diagram of an example of a computing platform according to an embodiment.

FIG. 8 shows a computing platform 70 (e.g., companion device) having a processor 72, system memory 74, a platform controller hub (PCH) 76, mass storage (e.g., hard disk drive/HDD, optical disk, flash memory) 78, a network interface/controller 80, one or more user interface (UI) devices 82 and various other controllers (not shown). The platform 70 may be part of, for example, a laptop, personal digital assistant (PDA), wireless smart phone, media player, imaging device, mobile Internet device (MID), any smart device such as a smart phone, smart tablet, and so forth, or any combination thereof. In addition, the platform 70 may be part of a smart TV, personal computer (PC), server, workstation, etc. Thus, the processor 72 may include one or more processor cores capable of executing a set of stored logic instructions, and an integrated memory controller (IMC) 84 configured to communicate with the system memory 74. The system memory 74 may include, for example, dynamic random access memory (DRAM) configured as a memory module such as, for example, a dual inline memory module (DIMM), a small outline DIMM (SODIMM), etc.

In the illustrated example, the processor 72 is configured to execute logic 86 that receives metadata associated with an activity of a user with respect to a first device such as a TV 10 (FIG. 1), conduct a capture of discovery content from one or more media sources such as the web services 38 (FIG. 5) based on the metadata, and present the discovery content and metadata to the user via the UI devices 82 of the platform 70. Thus, the logic 86 may implement one or more aspects of the method 18 (FIG. 7), already discussed.

The illustrated PCH 76, sometimes referred to as a Southbridge of a chipset, functions as a host device and may communicate with the network controller 80, which could provide off-platform wireless communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006), Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) telephony purposes.

The network controller 80 may also provide off-platform wired communication (e.g., RS-232 (Electronic Industries Alliance/EIA), Ethernet (e.g., IEEE 802.3-2005), power line communication (e.g., X10, IEEE P1675). USB (e.g., Universal Serial Bus, e.g., USB Specification 3.0, Rev. 1.0, Nov. 12, 2008, USB Implementers Forum), DSL (digital subscriber line), cable modem. TI connection, etc., functionality. In one example, the platform 70 uses the network controller 80 to obtain the metadata from another device such as the TV 10 (FIG. 1), already discussed. The UI (e.g., touch screen, liquid crystal display/LCD, light emitting diode/LED, keyboard, mouse, etc.) devices 82 may be capable of enabling a user to interact with and perceive information from the platform 70.

Embodiments described herein may therefore apply to many scenarios involving the consumption of media content. For instance, an individual may be listening to the radio on an in-vehicle-infotainment (IVI) system while driving home, while a set of metadata is being extracted and recorded on his or her smartphone. After arriving home, the individual may use the metadata in the smartphone to navigate to other media in other devices (such as video and movies on a flat screen TV, music on a home theater system, or websites on a home PC).

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multiprocessor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. At least one non-transitory computer accessible storage medium comprising a set of instructions which, if executed by a processor, cause a computer to:
configure one or more widgets based on user input;
receive real-time metadata associated with an activity of a user with respect to a first device, wherein the first device is to provide media content to the user, and wherein the real-time metadata is to include a keyword;
display the real-time metadata of the first device to the user via a screen of a second device and wait for user interaction, wherein the display is to include presentation of the keyword to the user via the screen of the second device in a list of keywords;
detect a selection from the real-time metadata by the user via the screen of the second device, wherein the selection is to include a selection by the user of the keyword from the list of keywords via the screen of the second device;
use the one or more widgets to capture discovery content from one or more media sources based on the selection by the user via the screen of the second device, wherein the one or more media sources are to include at least one web service;
display the discovery content to the user via the screen of the second device, navigate, via the second device, to a different secondary media content presented on a different third device in response to user interaction with the keyword displayed on the second device that is based on the real-time metadata of the first device.

2. The medium of claim 1, wherein the activity is to include at least one of watching television, listening to music-type audio files and reading a book-type text based content.

3. The medium of claim 1, wherein the real-time metadata and the activity are to be associated with separate distribution paths.

4. At least one non-transitory computer accessible storage medium comprising a set of instructions which, if executed by a processor, cause a computer to:
receive real-time metadata associated with an activity of a user with respect to a first device, wherein the first device is to provide media content to the user, and wherein the real-time metadata is to include a keyword;
display the real-time metadata of the first device to the user via a screen of a second device and wait for user interaction, wherein the display is to include presentation of the keyword to the user via the screen of the second device in a list of keywords;
detect a selection from the real-time metadata by the user via the screen of the second device, wherein the selection is to include a selection by the user on the keyword in the list of keywords via the screen of the second device;
capture discovery content from one or more media sources based on the selection by the user via the screen of the second device;
display the discovery content to the user via the screen of the second device; and
navigate, via the second device, to a different secondary media content presented on a different third device in response to user interaction with the keyword displayed on the second device that is based on the real-time metadata of the first device.

5. The medium of claim 4, wherein the activity is to include at least one of watching television, listening to music-type audio files and reading a book-type text based content, wherein the real-time metadata and the activity are to be associated with separate distribution paths, and wherein the one or more media sources are to include at least one web service from a plurality of preferred web services.

6. The medium of claim 4, wherein the real-time metadata is to be received in accordance with a chat protocol.

7. The medium of claim 6, wherein the chat protocol is to one or more of include extensible messaging and presence protocol to support bidirectional messaging that is to discover devices and exchange metadata associated with the media content, support a publisher-subscriber mechanism to allow one or more devices capable of consuming the real-time metadata to subscribe to the first device, wherein the first device is to send the real-time metadata to each of the one or more devices that are subscribed, and support the exchange of one or more multicast domain name system messages to discover devices and the exchange of a subscription message to subscribe to keywords.

8. The medium of claim 4, wherein the instructions, if executed, cause a computer to configure one or more widgets based on user input, and wherein the one or more widgets are to be used to capture the discovery content from the one or more media sources.

9. The medium of claim 4, wherein a relevant keyword in the list of keywords is to be based on an identification of one or more of a proper noun, a chain of consecutive proper nouns, or proper nouns separated by a preposition.

10. The medium of claim 4, wherein a relevant keyword in the list of keywords is to be based on one or more of a rank and a user behavior, wherein the rank is to be based on a location of the keyword in one or more of the real-time metadata and the media content, and wherein the user behavior is to be based on one or more of historical data associated with the user, an identification of an individual on a network shared by the user, and an interaction with an individual on a network shared by the user.

11. The medium of claim 4, further including allowing the user to navigate through a plurality of aggregated piles of keywords of the media content based on where and/or when the keyword is introduced in the media content.

12. The medium of claim 4, wherein the first discovery panel and the second discovery panel are to be distinct graphical user interface windows based on a type of discovery content.

13. The medium of claim 4, wherein the first discovery panel and the second discovery panel are to be distinct graphical user interface windows based on the media sources.

14. A companion device comprising:
a user interface;
a network interface;
a processor; and
at least one computer accessible storage medium including a set of instructions which, if executed by the processor, cause the companion device to, receive real-time metadata via the network interface, wherein the real-time metadata is to be associated with an activity of a user with respect to a media device that is to provide media content the user, and wherein the real-time metadata is to include a keyword,
display the real-time metadata of the media device to the user via the user interface of a second device and wait for user interaction, wherein the display is to include presentation of the keyword to the user via the user interface in a list of keywords,
detect a selection from the real-time metadata by the user via the user interface,
wherein the selection is to include a selection by the user of the keyword from the list of keywords via the user interface,
capture discovery content from one or more media sources based on the selection by the user via the user interface,
display the discovery content to the user via the user interface, and
navigate, via the second device, to a different secondary media content presented on a different third device in response to user interaction with the keyword displayed on the second device that is based on the real-time metadata of the media device.

15. The companion device of claim 14, wherein the activity is to include at least one of watching television, listening to music-type audio files and reading a book-type text based content.

16. The companion device of claim 14, wherein the real-time metadata and the activity are to be associated with separate distribution paths.

17. The companion device of claim 14, wherein the real-time metadata is to be received in accordance with a chat protocol.

18. The companion device of claim 14, wherein the instructions, if executed, cause the companion device to configure one or more widgets based on user input, and wherein the one or more widgets are to be used to capture the discovery content from the one or more media sources.

19. The companion device of claim 14, wherein the one or more media sources are to include at least one web service from a plurality of preferred web services.

20. An apparatus comprising:
a processor, the processor including one or more of configurable logic or fixed functionality logic hardware; and
logic, implemented at least partly in one or more of the configurable logic or the fixed functionality logic hardware, to,
receive real-time metadata associated with an activity of a user with respect to a first device, wherein the first device is to provide media content to the user, and wherein the real-time metadata is to include a keyword,
display the real-time metadata of the first device to the user via a screen of a second device and wait for user interaction, wherein the display is to include presentation of the keyword to the user via the screen of the second device in a list of keywords,
detect a selection from the real-time metadata by the user via the screen of the second device, wherein the selection is to include a selection by the user of the keyword from the list of keywords via the screen of the second device,
capture discovery content from one or more media sources based on the selection by the user via the screen of the second device,
display the discovery content to the user via the screen of the second device; and
navigate, via the second device, to a different secondary media content presented on a different third device in response to user interaction with the keyword displayed on the second device that is based on the real-time metadata of the first device.

21. The apparatus of claim 20, wherein the activity is to include at least one of watching television, listening to music-type audio files and reading a book-type text based content.

22. The apparatus of claim 20, wherein the real-time metadata and the activity are to be associated with separate distribution paths.

23. The apparatus of claim 20, wherein the real-time metadata is to be received in accordance with a chat protocol.

24. The apparatus of claim 20, wherein the logic is to configure one or more widgets based on user input, and wherein the one or more widgets are to be used to capture the discovery content from the one or more media sources.

25. The apparatus of claim 20, wherein the one or more media sources are to include at least one web service from a plurality of preferred web services.

\* \* \* \* \*